Patented Nov. 21, 1950

2,531,339

UNITED STATES PATENT OFFICE 2,531,339

METHOD OF PREPARING ELECTRON-EMISSIVE COATING MATERIALS

Erwin F. Lowry, Lynn, and Horace H. Homer, Arlington, Mass., assignors to Sylvania Electric Products Inc., Salem, Mass., a corporation of Massachusetts No Drawing. Application July 30, 1948,
Serial No. 41,717

8 Claims. (Cl. 250—27.5)

This invention relates to electric gaseous discharge device electrodes and more particularly to a method of preparing coatings of electron-emissive material therefor.

An object of this invention is to provide an improved method of preparing coatings of electron-emissive material for electric gaseous discharge device electrodes.

Another object is to provide a coating mixture of electron-emissive material which is characterized by a fine particle size of all components.

A further object is to provide a coating mixture of electron-emissive material which is characterized by an intimate mixture of the components thereof.

In the manufacture of electric gaseous discharge devices, and more particularly in the manufacture of fluorescent lamps of the oxide-coated electrode type, i. e., those in which the electrodes comprise a coiled filament of tungsten wire, such as that shown in U. S. Patent 2,258,158, for example, the electrodes are usually provided with a coating of an electron-emissive material. In the case of a fluorescent lamp electrode, the electron-emissive material usually comprises an oxide of one or more of the alkaline earth metals. For convenience, the alkaline earth metals are usually applied in the form of a carbonate which breaks down to the oxide when the lamp is processed.

U. S. application Serial Number 752,698, filed June 5, 1947 entitled "Electrode Coating For Discharge Devices," teaches the addition of zirconium dioxide in proper amounts to the basic electron-emissive material with which the electrodes are coated. The instant inventon embodes the idea of co-precipitating $ZrO_2$ and a carbonate of one or more of the alkaline earth metals to obtain a more intimate mixing of a fine particle size $ZrO_2$ with the complex alkaline earth carbonate than is possible by present mechanical mixing methods.

In one modification of our invention, about 19 grams of zirconyl nitrate are stirred into about 1500 cc. of distilled water until the nitrate has been dissolved. About 24 grams of calcium nitrate, about 125 grams of barium nitrate and about 89 grams of strontium nitrate are then stirred into this solution which is brought to about 85° C. This constitutes solution A.

About 137 grams of ammonium carbonate are dissolved in 1 liter of distilled water and about 5 cc. of concentrated ammonium hydroxide is added to stabilize the ammonium carbonate. This solution, which is solution B, is then brought to about 35° C.

Solution B is then added slowly, with rapid stirring, to solution A, about five minutes being taken to effect the addition. This mixture of solution A and solution B produces a precipitate of mixed crystals of barium carbonate, strontium carbonate, calcium carbonate, and the zirconyl form of zirconium carbonate. The suspension is then stirred rapidly for about five minutes to complete the precipitation, and the precipitate allowed to settle for about thirty minutes, returning to normal room temperature. The precipitate is then washed substantially free of soluble ions by any suitable means well known in the art, filtered, and dried. We prefer to dry at about 350° C. for about five hours to not only remove the water but also to convert the zirconyl form of zirconium carbonate which is unstable and hydroscopic to zirconium dioxide which is stable and does not pick up water. The temperature at which this heating operation is carried out is kept low enough to prevent decomposition of the alkaline earth carbonates. Although we prefer to convert the zirconyl form of zirconium carbonate to zirconium dioxide at this time, it is not necessary to do so. One may, if desired, use the zirconyl form of zirconium carbonate in the electrode coating composition and convert it to zirconium dioxide during the processing of the discharge device with which the coated electrode is employed.

The action of zirconyl nitrate and ammonium carbonate alone in solution produces a gelatinous precipitate which settles slowly and dries to a dense mass, but the co-precipitation of it with the other three ingredients produces a very fine crystalline mixture. The particle sizes of the resulting crystallite can be varied by changing the temperature of the solutions, the speed of stirring, and the rate of addition of the ammonium carbonate solution.

Although we prefer to use zirconyl nitrate and the nitrates of an alkaline earth metal or metals as our basic starting materials, other soluble salts such as the chlorides and the acetates may be employed without departing from the spirit of our invention.

In the specific example of our process described in detail above, the relative proportions of the various materials were selected to provide a coating composition of electron-emissive material having 48 mol percent of barium, 42 mol percent of strontium, 10 mol percent of calcium, and a quantity of zirconium dioxide equal to about 5 percent by weight of the barium, strontium and calcium carbonates. However, it will be readily understood by those skilled in the art that the relative proportions of the starting materials may be varied without departing from the spirit of our invention.

What we claim is:

1. The method of preparing electron-emissive material powder which comprises co-precipitating a solution of a soluble salt of zirconium and at least one alkaline earth metal and a solution of ammonium carbonate; washing the precipitate; filtering the precipitate; and drying the precipitate.

2. The method of preparing electron-emissive material powder which comprises co-precipitating a solution of a soluble salt of zirconium, barium, strontium and calcium, and a solution of ammonium carbonate; washing the precipitate; filtering the precipitate; and drying the precipitate.

3. The method of preparing electron-emissive material powder which comprises co-precipitating barium carbonate, strontium carbonate, calcium carbonate, and the zirconyl form of zirconium carbonate.

4. The method of preparing electron-emissive material powder which comprises co-precipitating barium carbonate, strontium carbonate, calcium carbonate, and the zirconyl form of zirconium carbonate, and heating the same at a temperature of about 350° C. for about five hours.

5. The method of preparing electron-emissive material powder which comprises making a water solution of a soluble zirconium salt and a soluble salt of barium, strontium, and calcium, and then precipitating out the carbonates of barium, strontium and calcium, and the zirconyl form of zirconium carbonate.

6. The method of preparing electron-emissive material powder which comprises making a water solution of the nitrates of barium, strontium, calcium and zirconium, the last mentioned metal being in the zirconyl form, and then precipitating out the carbonates of barium, strontium, and calcium and the zirconyl form of zirconium carbonate.

7. The method of preparing electron-emissive material powder which comprises making a water solution of the nitrates of barium, strontium, calcium, and zirconium, the last mentioned metal being in the zirconyl form, and then adding ammonium carbonate thereto to precipitate the carbonates of barium, strontium and calcium, and the zirconyl form of zirconium carbonate.

8. The method of preparing electron-emissive material powder which comprises dissolving zirconyl nitrate in water; adding calcium nitrate, barium nitrate, and strontium nitrate to said solution; adding a water solution of ammonium carbonate to said first-mentioned solution; permitting the mixture of these two solutions to settle; decanting and washing the precipitate several times; and drying the precipitate.

ERWIN F. LOWRY.
HORACE H. HOMER.

REFERENCES CITED

The following references are of record in the file of this patent:

UNITED STATES PATENTS

| Number | Name | Date |
| --- | --- | --- |
| 1,915,186 | Hale | June 20, 1933 |
| 1,981,245 | Pearcy | Nov. 20, 1934 |